(12) United States Patent
Beeloo et al.

(10) Patent No.: US 6,432,327 B2
(45) Date of Patent: Aug. 13, 2002

(54) FORMED POLYETHYLENE TEREPHTHALATE POLARIZING FILM FOR INCORPORATION IN OPTICAL-GRADE PLASTIC PARTS

(75) Inventors: Edward A. Beeloo, Torrance; Nancy L. S. Yamasaki, Long Beach; Russell E. Evans, Chino Hills; Thomas Balch, Rancho Palos Verdes, all of CA (US)

(73) Assignee: Younger Mfg. Co., Torrance, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/569,479

(22) Filed: May 12, 2000

Related U.S. Application Data

(63) Continuation-in-part of application No. 09/475,424, filed on Dec. 29, 1999, now Pat. No. 6,220,703.

(51) Int. Cl.[7] .............................................. B29D 11/00
(52) U.S. Cl. ......................... 264/1.34; 264/1.7; 264/2.7
(58) Field of Search ......................... 264/1.1, 1.7, 1.32, 264/1.34, 2.7; 351/162, 163, 165

(56) References Cited

U.S. PATENT DOCUMENTS 3,051,054 A * 8/1962 Crandon (List continued on next page.)

OTHER PUBLICATIONS

Rodriguez, Ferdinand, "Principles of Polymer Systems," Hemisphere Publishing Corporation, Third Edition, pp. 20–27, and 484–487 (1989).

Hollander, A. et al. "The Influence of Vacuum–Ultraviolet Radiaton on Poly(ethlene terphthalate)," *Journal of Polymer Science Part A: Polymer Chemistry*, vol. 34, 1511–1516 (1996).

Plastics Engineering Handbook of the Society of the Plastics Industry, Inc., Third Edition, Reinhold Publishing Corporation, New York, pp. 492–493 (1960).

Liston, Edward M., "Plasma Treatment for Improved Bonding: A Review," 35th Sagamore Army Materials Research Conference, pp. 199–218 (1988).

Glocker, David A. et al., "Plasma Sources for Polymer Surface Treatment," *Handbook of Thin Film Process Technology* (1996).

*Primary Examiner*—Mathieu D. Vargot
(74) *Attorney, Agent, or Firm*—Lyon & Lyon LLP

(57) ABSTRACT

An optical-quality plastic part is provided having a PET polarizing film formed to contour with the optical requirements of the plastic construct without jeopardizing its optical, mechanical or cosmetic properties.

23 Claims, 3 Drawing Sheets

U.S. PATENT DOCUMENTS

| | | | |
|---|---|---|---|
| 3,833,289 A | 9/1974 | Schuler | 350/155 |
| 3,846,013 A * | 11/1974 | Cohen | |
| 3,940,304 A | 2/1976 | Schuler | 156/245 |
| 4,090,830 A | 5/1978 | Laliberte | 425/117 |
| 4,268,127 A | 5/1981 | Oshima et al. | 350/337 |
| 4,274,717 A | 6/1981 | Davenport | 351/169 |
| 4,352,776 A * | 10/1982 | Weisner | 267/2.7 |
| 4,418,992 A | 12/1983 | Davenport et al. | 351/169 |
| 4,427,741 A | 1/1984 | Aizawa et al. | 428/332 |
| 4,617,207 A | 10/1986 | Ueki et al. | 428/1 |
| 4,756,953 A * | 7/1988 | Utsumi | |
| 4,824,882 A * | 4/1989 | Nakamura et al. | |
| 4,873,029 A | 10/1989 | Blum | 264/1.3 |
| 4,895,769 A * | 1/1990 | Land et al. | 264/1.34 |
| 5,049,427 A | 9/1991 | Starzewski et al. | 428/40 |
| 5,051,309 A | 9/1991 | Kawaki et al. | 428/332 |
| 5,059,356 A * | 10/1991 | Nakamura et al. | |
| 5,071,906 A | 12/1991 | Tanaka et al. | 524/557 |
| 5,084,226 A * | 1/1992 | Tarlton et al. | 264/2.7 |
| 5,286,419 A | 2/1994 | Van Ligten et al. | 264/1.3 |
| 5,434,707 A | 7/1995 | Dalzell et al. | 359/485 |
| 5,641,372 A | 6/1997 | Okuno | 156/230 |
| 5,702,813 A | 12/1997 | Murata et al. | 428/332 |
| 5,718,849 A | 2/1998 | Maus et al. | 264/2.2 |
| 5,751,481 A * | 5/1998 | Dalzell et al. | 264/1.32 |
| 5,757,459 A | 5/1998 | Bhalakia et al. | 351/168 |
| 5,800,744 A * | 9/1998 | Munakata | 264/1.7 |
| 5,808,721 A | 9/1998 | Wood et al. | 351/159 |
| 5,827,614 A | 10/1998 | Bhalakia et al. | 428/411.1 |
| 5,830,578 A | 11/1998 | Ono et al. | 428/446 |
| 5,882,774 A | 3/1999 | Jonza et al. | 428/212 |
| 5,926,310 A | 7/1999 | Tamura et al. | 359/350 |
| 5,965,247 A | 10/1999 | Jonza et al. | 428/212 |
| 5,991,072 A | 11/1999 | Solyntjes et al. | 359/361 |
| 5,997,139 A * | 12/1999 | Yasuda | 264/1.7 |
| 6,220,703 B1 * | 4/2001 | Evans et al. | |

\* cited by examiner

FORMED POLYETHYLENE TEREPHTHALATE POLARIZING FILM FOR INCORPORATION IN OPTICAL-GRADE PLASTIC PARTS

CROSS-REFERENCE TO RELATED APPLICATION

This is a continuation-in-part of application Ser. No. 09/475,424, filed Dec. 29, 1999, now U.S. Pat. No. 6,220,703, hereby incorporated by reference as if fully set forth herein.

BACKGROUND OF THE INVENTION

The field of the present invention relates to the use of formed polyethylene terephthalate (PET) polarizer film in optical-quality plastic parts.

A variety of polarizing films is known to exist. Conventional polarizing films, however, have not been comprised of PET. This fact is primarily due to PET's inert properties. The use of PET polarizing films in optical-quality polarized parts, as disclosed in the parent application, is therefore a unique innovation. Moreover, as disclosed in the parent application, such polarized parts can include ophthalmic lenses (semi-finished or finished prescription or non-prescription blanks, lenses, goggles, visors, shields), polarized facemasks or shields, and polarized display devices or windows that require low haze.

Two requirements should be met for all such optical applications: (1) controlled and reproducible curving of the polarizing film to accommodate the contour of the optical parts; and (2) controlled positioning of the polarizer film in the optical-plastic construct.

Much of the formed film manufactured for ophthalmic lenses is laminated, that is, a thin material with the desired optical or mechanical properties (polarization, optical density, color, resistance to breakage, etc.) is sandwiched between two additional layers of plastic for easier handling. These sheets are often joined by adhesives but may be chemically bonded. Lamination techniques with adhesives or by thermal heating are well-known (e.g., *Plastics Engineering Handbook*, pp. 492ff, The Society of Plastics Industry, Inc. New York, 1960). U.S. Pat. Nos. 5,286,419 and 5,051,309, which are incorporated by reference as if fully set forth herein, discuss heating and forming such laminates of one or more support layers in combination with polarizers.

The problem with lamination is that under stress, the joined layers may delaminate, leaving defects that compromise either the appearance or integrity of the final product. Therefore, techniques have also been developed to form free-standing film into desired shapes.

Free-standing film techniques commonly involve heating the film directly to a softening point so that pressure, vacuum, or a combination of both can be used to force the film into a molded shape. A distinct problem with applying these techniques to common polarizer film (e.g., polyvinyl alcohol (PVA)) is that the high heat needed to soften the film sufficiently to slump into the mold's shape damages the optical and/or mechanical properties of the film. Accordingly, improvements in polarizer films or forming techniques are desirable.

As disclosed in the parent application, polarized film comprised of PET such as that described in U.S. Pat. No. 5,059,356, which is incorporated by reference as if fully set forth herein, has several advantages over PVA, including affordability, significantly better heat, moisture, and solvent resistance, and good mechanical stability.

The present inventors recognized that an optical-quality plastic part utilizing PET film might offer advantages over an optical construct utilizing a conventional polarizer such as PVA film if the inert PET film could be reliably incorporated into the optical construct. Thus, a suitable method to form the PET polarizer film and properly position the film within the construct is desired.

Polyethylene terephthalate is widely used to form plastic bottles via blow molding. Blow molding, however, is not suitable for forming polarized PET film. In blow molding, melted PET material is extruded as a!tube that is then sealed at one end and expanded into a cooled outer mold shape by forcing air or other gases into the interior of the hot plastic tube. First, an enclosed shape such as this is not suitable for most optical constructs, which normally have open, curved shapes. Secondly, and more importantly, this common technique requires melting the PET, which would negate the polarizing effect of this film.

A similar loss of the polarizing effect of the PET film would result if another common technique, vacuum forming of hot or molten material, was used. In addition, vacuum forming requires vias in the mold to remove entrapped air. Such vias cause unacceptable marks on the polarizer film, resulting in optical distortion on the final parts.

Alternatively, the PET film may be curved or formed by techniques commonly known to those skilled in the art as described in, for example, U.S. Pat. Nos. 5,641,372 and 5,434,707, which disclosures are hereby incorporated by reference as if fully set forth herein. In particular, U.S. Pat. No. 5,641,372 describes the use of vacuum and liquid pressure to force a heated sheet of material against the molding surface, whereas U.S. Pat. No. 5,434,707 describes forming a laminated part under heat and pressures in the range of 250–300 psi.

Such techniques used to form conventional polarizer laminates or free-standing PVA films are not appropriate for forming PET polarizer films. In particular, the PET polarizer film has a thickness of ~100 $\mu$. Laminates have a minimum thickness of 0.6 mm, which is a significantly larger mass for heat transfer. In addition, the laminate construction (of protective thermoplastic layers on each side of the polarizer film) means that the polarizer will experience less heat than the outer protective layers. This construction means that the polarizing property of the sandwiched film is less likely to be compromised than in a free-standing PET film. On the other extreme, the free-standing polyvinyl alcohol films are commonly only about 30 $\mu$ thick, and have much less elasticity than the PET polarizer film. Hence, these thinner, weaker films can be forced out of shape more readily than the PET polarizer film.

Accordingly, an improved method of forming a polarizer film into a curved shape to. accommodate the contour of the typical optical application, and then reliably incorporate the formed film into an optical-quality plastic part without degrading the optical and/or mechanical properties of the film is desired.

SUMMARY OF THE INVENTION

The preferred embodiments relate to an optical-quality plastic part having a PET polarizing film formed to a curved shape suitable for the optical application, and to a method of reliably positioning the film relative to surfaces of the optical construct. In addition, the optical performance and cosmetic quality of the formed film is preferably maintained at the high level required for optical-quality constructs such as ophthalmic lenses and displays. Various other embodiments may utilize some but not all of the above elements, or may include additional refinements, while obtaining the benefit of an optical-quality plastic part utilizing PET film.

BRIEF DESCRIPTION OF THE DRAWINGS

The various objects, features, and advantages of the present inventions may be better understood by examining the Detailed Description of the Preferred Embodiments found below, together with the appended figures, wherein.

DETAILED DESCRIPTION OF THE PREFERRED EMBODIMENTS

The preferred embodiments will now be described with respect to the drawings. To facilitate the description, any numeral identifying an element in one figure will represent the same element when used in any other figure.

As disclosed in the parent application, the optical-quality plastic substrate (e.g., lens substrate) may comprise a thermoset material or a thermoplastic material. With respect to thermoset materials, the preferred materials comprise polymers from diethylene glycol bis (allyl carbonate) or diallyl diglycol carbonate, such as CR-39® from PPG Industries, Inc., or Akzo Nobel brand NS205. The optical-quality plastic substrate may comprise other thermoset materials such as polymers of 1,3 butylene glycol dimethacrylate, acrylonitrile, allyl methacrylate, ethoxymethyl methacrylate, ethylene glycol dimethacrylate, polyethylene glycol dimethacrylate; ally-esters; co-polymers of allyl esters with styrene or vinyl type monomers, such as diallyl maleate, diallyl phthalate, methallyl methacrylate, etc.; and high index copolymers containing, e.g., vinyl functionality, isocyanates, urethanes, sulfur-containing aromatic vinyl compounds, and bromine-containing aromatic acrylic compounds.

With respect to thermoplastic materials, the preferred materials comprise polycarbonate (PC) resin such as that sold by Bayer, Inc. of Pittsburgh, Pa. under their trademarks Makrolon® DPI-1821 or 1815, or Lexan® OQ2720 manufactured by General Electric. The optical-quality plastic substrate may comprise other thermoplastic materials such as polysulfones, polyethersulfones, polyamides, polystyrenes; and mixtures of PC and polyurethanes, polyesters, polysulfones, polystyrenes, amorphous polyolefins, and acrylics.

The PET film is preferably of very high optical quality to match ophthalmic standards, such as Developmental Film 99-04 distributed by R&S Enterprises of Yokohama, Japan with a polarizing efficiency of at least 96.3% and a transmission average (400–700 nm) of 14–18%. The present inventors currently prefer the un-annealed form to the standard annealed form of Developmental Film 99-04 distributed by R&S Enterprises. The PET film may further comprise a crystalline or semi-crystalline naphthalene dicarboxylic acid, such as polyethylene naphthalate polyester or a copolymer derived from ethylene glycol, naphthalene dicarboxylic acid, and some other acids such as terephthalate.

While the preferred embodiments utilize PET film, the following disclosed forming techniques are also applicable to other heat-sensitive polymer films, or for PET films that may contain other heat-sensitive additives. Such additives could include organic dyes or colorants, photochromic agents, and ultraviolet, infrared, or selective visible light absorbers.

Figure 1:
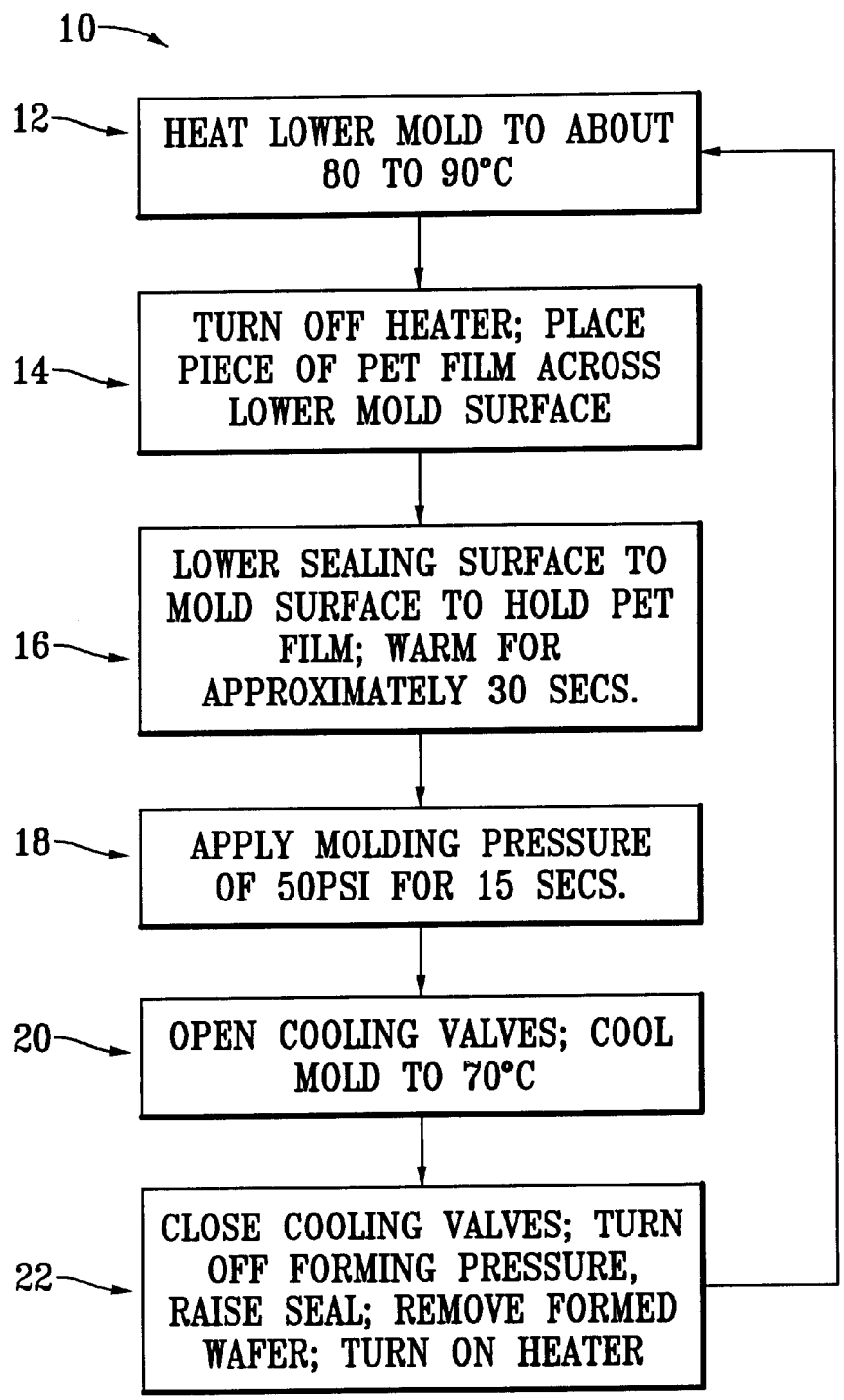
FIG. 1 is a flowchart illustrating the general forming process for PET polarizer film according to a preferred embodiment.

The following disclosed forming techniques, as exemplified in FIG. 1, realize a more reliable, optical-quality part compared to conventional techniques that are complicated and likely to damage the optical and/or mechanical properties of the polarizing film.

As illustrated in FIG. 1, contrary to conventional techniques of film forming, with the preferred embodiments, the film is not actively heated before being placed in contact with the molding surface. Thus, less degradation occurs for two reasons: first, the film is not subjected to excessive heat that causes burning or discoloration of the film; and secondly, the film is not heated such that it undergoes unsupported stretch that mis-aligns the polarizer. Preservation of both these characteristics is ideal to the usefulness of this product.

Turning in detail to FIG. 1, this PET film forming flow chart illustrates forming PET film at the lowest preferred settings 10 beginning with the step of "heat lower mold to about 80 to 90° C." 12. Advantageously. step 12 involves heating a single mold surface for shaping the film. Thus, step 12 is an improvement over conventional PET forming techniques, such as the blow-forming technique discussed above. This is typically because that technique require the expense and added care of mated forming surfaces, and in any event would likely compromise the film's polarization characteristic. In step 12, the single mold surface is heated to a temperature above the glass transition of the PET polarizing film (69° C.), but significantly lower than the film's melting point (~250° C.). The preferred mold temperature, identified experimentally, is approximately 135° C., but temperatures as low as about 80–90° C. can be used successfully. As the temperature of the mold is increased further (>145° C.), this extra heating will burn, discolor, or mis-shape the film.

The next step in FIG. 1 illustrates the step of "turn off heater; place piece of PET film across lower mold surface" 14. In step 14, the heater is turned off, and the PET polarizing film is bridged across the edges that define the limits of the mold's surface. The mold may comprise spherical, cylindrical, or compound curves that combine such shapes as spherical, cylindrical, and toric elements.

For example, an aspherical shape is often desired for a particular optical application. In fact, the aspherical shape is typically used for progressive ophthalmic lenses. To effect this shape for such an optical application, one requires a mold wherein the spherical radius of curvature for the main viewing region can be ~84 mm, but can change over a distance of less than 15 mm to achieve a spherical radius of only 47 mm for increased lens power in the reading zone. The embodiments of the present invention allow controlled forming of the film to this type of contoured application without compromising the film's optical properties by introducing folds, wrinkles, or other physical defects in the film, or losing the required polarization.

Referring to FIG. 1, the next step of "lower sealing surface to mold surface to hold PET film; warm for approximately 30 secs" 16 involves a sealing surface that is pressed behind the PET polarizer film to hold at least the edges of the film against the desired mold surface, or against a sealing or gasket material on its edges. The sealing surface behind the film need not be conformal to the final shape, or contact the PET film except at the general location of the edges of the mold surface. For simplicity, it may be flat or shaped in any convenient manner that holds the film against the edges of the mold. A solid part, such as a flat-metal sheet or a soft, deformable plastic, may be used. Preferably, the sealing surface should also be adapted to hold the film stationary against these edges when moderate pressure is applied.

The film may be pressed directly against the edges of the molding surface or separated by a sealing or gasket material. Similarly, the sealing surface may directly contact the film, or be separated from it by gaskets, o-rings, or other sealing media. Thus, the sealing surface should be adapted to secure the film in place, withstand mild additional pressure, direct this added force relatively evenly against the film, and not cause distortion of the film in the final working area.

Once the film has been sealed against the edges of the mold, this closed environment is allowed to warm with the residual heat of the mold. Such warming currently requires approximately thirty seconds, as shown in step 16.

FIG. 1 illustrates the active forming step of "apply molding pressure of about 50 psi for approximately 15. secs" 18 after the sealing and warming step 16. In active forming step 18, added pressure is applied through or via movement of the sealing surface behind the PET film to conform the film to the mold surface. One preferred method of applying this pressure is to introduce air or other pressurized gases through the sealing surface onto the back of the film. This pressure can be directed through a single channel in a metal backing plate or multiple channels in a porous backing plate. Alternately, the pressure may be applied indirectly if a deformable sealing surface is used. With a deformable sealing surface, pressurized gases may be directed at the sealing material, which then changes its distance from the film and creates an indirect pressure wave to press the film against the mold.

In active forming step 18, the preferred pressure range is approximately 10–20 psi, and most preferably the range is approximately 15–20 psi. Pressures in the range of 5–50 psi may be used. Pressures in the upper portion of this range are preferred if lower molding temperatures are employed. At higher pressures, unacceptable wrinkling may occur at the sealing surface or sealing gasket. In addition, higher pressures may cause wrinkling or distortion in the main molding surface because they do not allow the film to adapt to the forming surface evenly.

In the disclosed forming embodiments, the pressure may be applied from approximately 15–45 seconds, depending on the mold shape. The slightly longer forming times are used for deeper or more complicated (non-spherical) mold shapes. As shown in step 18, pressure at about 50 psi is applied for approximately 15 seconds, but it should be noted that other pressures as discussed are contemplated by the current invention.

Advantageously, with the forming embodiments disclosed herein, active vacuum is not used to either remove the trapped gases or draw the film against the molding surface. This improvement simplifies the production process and the forming equipment requirements, and avoids any deformations caused by actively drawing the film against vacuum ports. Nonetheless, if a vacuum assist is desired, vent hole(s) or channel(s) may optionally be incorporated into a film forming apparatus.

After the short forming time of step 18, FIG. 1 illustrates the next step is "open cooling valves; cool mold to about 70° C." 20. Step 20 describes another preferred stage in the process: cooling the mold. With the forming techniques disclosed herein, as noted above, only the forming mold has been heated, while the rest of the forming equipment remains at approximately room temperature. This advantage also simplifies production requirements and ensures that the PET film is not overheated in the forming process. Therefore, at step 20 it is preferred that only the forming mold surface is actively cooled. An alternate embodiment may include additional cooling in the upper sealing surface, for faster, albeit indirect, heat transfer.

In step 20, the mold is cooled preferably to about 70–85° C., and most preferably to about 75° C. As FIG. 1 illustrates the lowest settings, step 20 shows the mold may be cooled to about 70° C. This short cooling step in the mold allows the film to further "set" into its new shape. If it is removed at the mold temperature, the film may not replicate the mold surface sufficiently for reproducible optical constructs. There is also a tendency for the film to adhere to the mold while it is still warm.

With the preferred embodiments, the molding surface is the active element for heating and cooling the film. Contrary to conventional forming techniques, which normally maintain the molding surface at a low temperature to simply freeze the hot (melted) material in place, the preferred embodiments advantageously allow the polarized PET film to be formed without protective thermoplastic; sheets, without destroying the optical properties of the film, and without causing heat damage to the film that degrades its mechanical integrity.

The final step in the exemplified forming process illustrated in FIG. 1 is "close cooling valves; turn off forming pressure, raise seal; remove formed wafer; turn on heater" 22. Step 22 ends the pressure and cooling cycle, and removes the sealing surface so that the formed film can be taken from the molding apparatus. At this point, one may begin the forming cycle with another piece of film, as indicated by the connection back to step 12.

After the film has been formed utilizing the disclosed embodiments exemplified by the flow chart of FIG. 1, the film may be subjected to surface treatments, as disclosed in the parent application and related continuation-in-part application entitled "Treated Polyethylene Terephthalate Polarizing Films For Improved Adhesion In Optical Parts," filed May 10, 2000, which is hereby incorporated by reference as if fully set forth herein. Such disclosed surface treatments advantageously allow this inert PET polarizing film to integrally bond to common optical-grade plastic materials, including thermosets, thermoplastics, and reaction-injection molding materials for realizing a variety of optical-quality plastic parts. Additionally, these methods may allow the formed film to be incorporated with existing optical plastic constructs by adhesive lamination, or binding to an outer surface of the part, or between surfaces of a multi-layered part.

An additional refinement for thermoset or reaction-injection molded mixtures is to use the molding apparatus described in application Ser. No. 09/447,445, filed Nov. 22, 1999, hereby incorporated by reference as if fully set forth herein. The molding apparatus disclosed therein allows for more precise positioning of the film within the optical-quality plastic construct, and better controlled introduction of liquid monomer(s) around both sides of the film.

I. OVERVIEW OF THE EXAMPLES

The preferred embodiments for forming and using formed PET polarizer film are more particularly described in the following examples that are intended as illustrations only since modifications and variations within the scope of the general disclosure will be apparent to those skilled in the art.

Examples 1–5 demonstrate the use of the disclosed forming techniques relative to one application and particularly the production of thermoplastic ophthalmic lenses. Example 3 demonstrates the limitations inherent in using existing laminate polarizer technology for non-spherically curved optical parts, in contrast to the advantages of the preferred embodiments as discussed in Examples 4 and 5.

Figure 2:
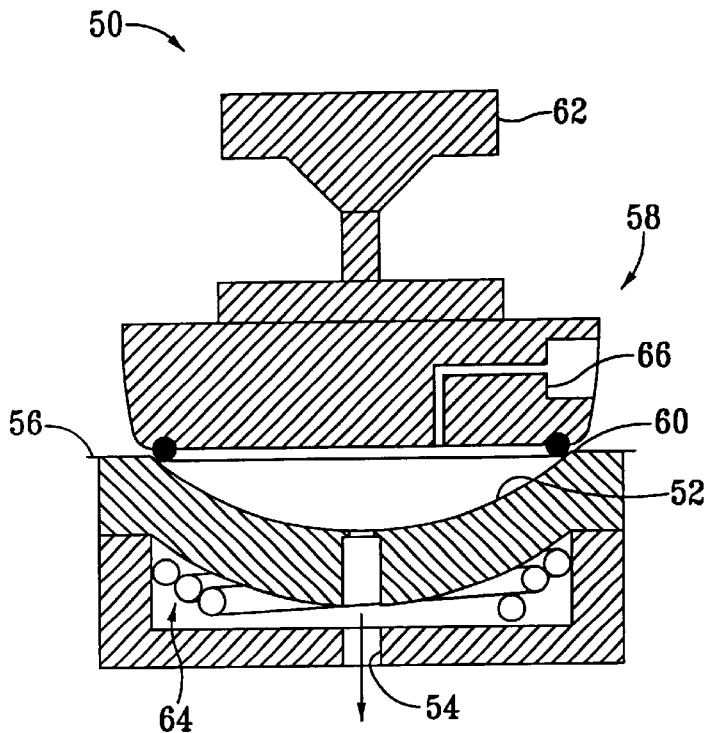
FIG. 2 illustrates an exemplary forming apparatus with heating and cooling coils for effecting a curved film piece.

FIG. 2 illustrates an exemplary forming apparatus 50 with heating and cooling coils for effecting a curved film piece. Utilized in Example 1, this polymer film-forming apparatus 50 comprises a concave (uniform or contoured in shape), heatable mold surface 52 with a through-gas vent hole 54 for allowing egress of air trapped between the film 56 and the mold surface 52. Although shown as a single hole 54, this means to allow egress of gases as the film is pressed to the mold 52 may take the form of minute hole(s) in the mold or minute channel(s) at the edge of the mold 52 to allow escape of entrapped gases between the materials. Thus, additional vent holes may be added, and if desired, active vacuum can be used to remove entrapped air. Advantageously, additional vents and vacuum were not employed in any of the disclosed Examples.

To reduce marking of the film during forming, the vent hole 54 pierces the molding surface with a very small (preferably <0.001") hole. This vent hole may be enlarged behind the molding surface 52 for optional use with vacuum. The molding surface 52 and vent hole 54 are shown in greater detail in FIG. 2c.

Figure 2A:
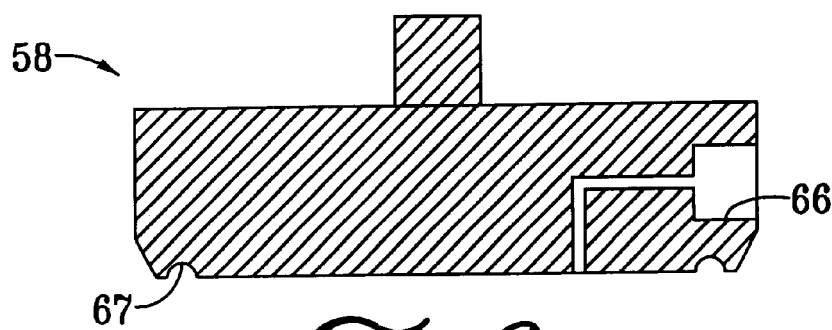
FIG. 2a is a detailed view of the sealing surface shown in FIG. 2.

A sealing surface 58 is placed over the film 56 either directly or preferably slightly separated by use of a gasket, o-ring or other buffer material indicated as sealing o-ring 60. The sealing surface 58, as best seen in FIG. 2a, may be a solid, flat metal plate with a groove 67 to retain the sealing o-ring 60 in its position at the edge of the molding surface 52. This sealing o-ring 60 may be positioned on the curve of the molding surface 52, on the edge of the molding surface 52, or sealing surface 58 can be. made larger such that sealing occurs on a flat area surrounding the curve of the mold 52 (see FIG. 2).

An air ram 62 or other suitable device may provide pressure to hold the sealing o-ring 60 securely against the film 56. Alternately, the sealing surface 58 may be an impermeable but. deformable material that will either contact the film 56 under pressure to force it against the molding surface 52, or transmit a pressure wave against the film 56 to direct it toward surface 52.

Figure 2B:
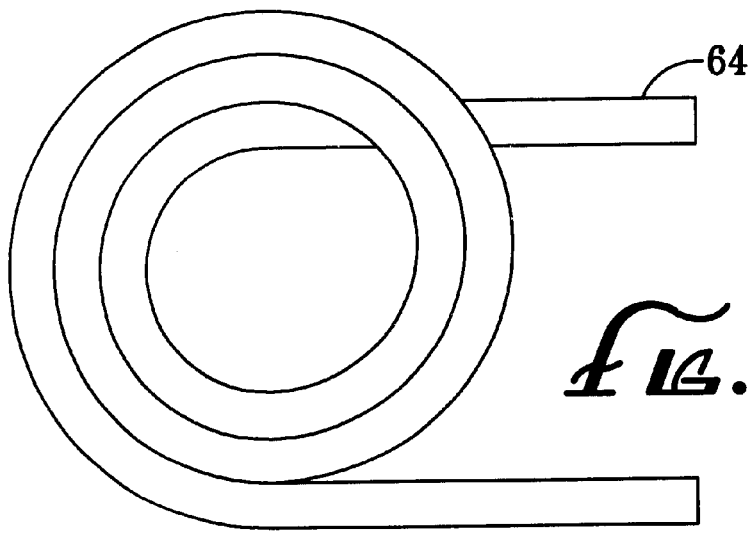
FIG. 2b is a detailed view of the combination heating/cooling coil shown in FIG. 2.
Figure 2C:
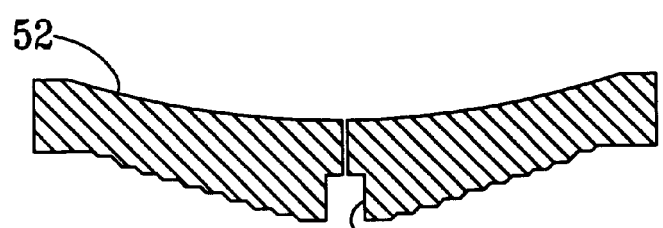
FIG. 2c is a detailed view of the molding surface. shown in FIG. 2.

A combination heating/cooling coil 64 may heat the molding surface 52. This coil 64 is shown in greater detail in FIG. 2b. Heated and cooled oil may be circulated through coil 64. Other materials (liquid, solid or gaseous) with good thermal conductivity can be used to provide heating and cooling of the molding surface 52.

The film 56 (either flat or previously curved) is inserted as shown to bridge across the molding surface 52. If the optional vacuum were used, it can be applied to draw the film onto the molding surface 52. In the disclosed Examples, only air (or other gas) pressure was applied to the opposite side of the film 56 through the gas pressure port 66 of sealing surface 58. The additional gas pressure in the closed environment defined by the molding surface 52 and the sealing surface 58 forced the film 56 against the molding surface 52. The film 56 is then cooled under pressure. The result is a film 56 with the shape and contours of the concave molding surface 52.

A. Example 1

As noted above, Example 1 utilized the forming apparatus 50 illustrated in FIG. 2. In this Example, the molding-apparatus 50 was equipped with a molding surface 52 curved to a spherical, concave shape with a radius of 124.7 mm (4.25 diopters, referenced to a refractive index of 1.53). Heating and cooling were supplied from hot (160° C.) and cold (21° C.) oil reservoirs through the combination coil 64.

The molding surface 52 was heated to a temperature of 143° C. The sealing surface 58, equipped with a sealing o-ring 60 and the molding surface 52, were then pneumatically separated and a piece of flat PET polarizer film 56 bridged across the molding surface 52. The sealing surface 58 and o-ring 60 were then lowered via air ram 62 pressure of 40 psi onto the film 56 to form an airtight seal.

The PET film 56 was allowed to warm for 60 seconds in this closed environment. After the warming period, air was admitted at 20 psi pressure through the gas pressure port 66. This pressure was applied for 30 seconds. The valves (not shown) directing the flow of oil for heat transfer were then switched from heating to cooling, and the formed film 56 allowed to cool under pressure to 74° C. The forming pressure was then released, the sealing surface 58 raised, and the formed PET film 56 removed.

At this point, the heat transfer valves could be switched to allow heating oil to re-enter the apparatus 50 and prepare for the next forming cycle. Total cycle time with this technique was ~10 minutes, due primarily to time required to heat and cool the common thermal transfer lines of coil 64.

The curve of the formed PET polarizer film 56 was evaluated by comparison with a 4.25 diopter template. The formed film 56 matched the curve very well. The formed film 56 was of the same cosmetic quality as the flat film, and polarization was equivalent. This formed film 56 was cut to shape, and successfully injection molded with optical-grade PC resin to yield a light polarizing lens with good optical qualities.

B. Example 2

Figure 3:
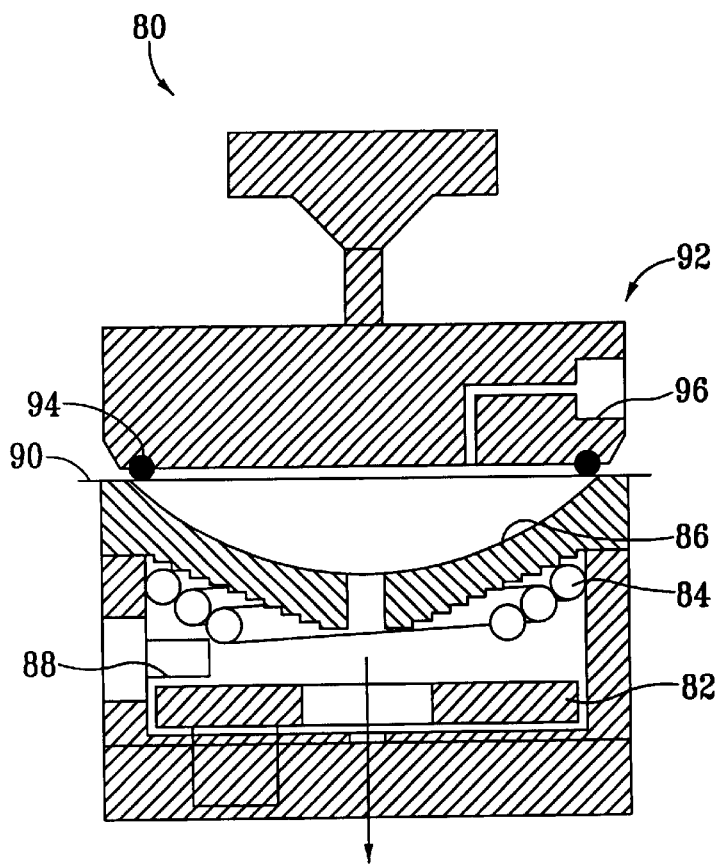
FIG. 3 illustrates another exemplary forming apparatus with electrical heater and separate cooling coils for effecting a curved film piece.

For improved cycle time, alternate methods of heating and cooling a forming apparatus were investigated. FIG. 3 illustrates an example of another, improved, exemplary forming apparatus 80, similar in respects to apparatus 50, but with electrical heater 82 and separate cooling coils 84 for effecting a curved film piece. As shown in FIG. 3, the molding surface 86 is heated using an electrical heater 82 and cooled with a closed loop system via separate cooling coils 84. In this instance, the coolant was oil and maintained by a chiller at 13° C.; other coolants can be employed. A thermocouple gauge 88 may be used to monitor the system's temperature.

The forming apparatus 80 as shown in FIG. 3 was equipped with a molding surface 86 curved to a spherical, concave shape with a radius of 64.24 mm (8.25 diopters, referenced to a refractive index of 1.53).

The power transformer of the electrical heater 82 was set to 100% and heated until the thermocouple 88 indicated 140° C. A piece of flat PET polarizer film 90 was bridged across the molding surface 86. Sealing surface 92 and o-ring 94 were then lowered via air ram pressure of 40 psi onto the film 90 to form an airtight seal. The heater 82 transformer was turned off, and the PET film 90 allowed to warm in this ambient, closed condition for 45 seconds. After the initial warming period, air pressure was admitted at 20 psi through the gas pressure port 96. The apparatus 80 was maintained at 135° C. at this pressure for 30 seconds. The cooling valves (not shown) were then opened to admit chilled oil into the coils 84, and the formed film 90 allowed to cool under pressure until a temperature of 74° C. was achieved. The forming pressure was then released, the sealing surface 92 raised, and the formed PET film 90 removed.

At this point, the: cooling valves may be closed, the transformer restarted, and the next forming cycle begun. With the apparatus of FIG. 3, the cycle time has been reduced to less than 6 minutes. Further cycle time improvements are probable with other heating/cooling systems.

The curve of the formed PET polarizer film 90 was evaluated by comparison with an 8.25 diopter template. The formed film 90 matched the curve very well. The formed film 90 was of the same cosmetic quality as the flat film, and polarization was equivalent. This formed film 90 was cut to shape, and successfully injection molded with optical-grade PC resin to yield a light polarizing lens with good optical qualities.

C. Overview of Examples 3, 4, and 5

Examples 3, 4 and 5 compare standard thermoplastic polarizer molding technology for non-spherical optical parts with the embodiments of the present invention.

Often, optical designs require non-spherical surfaces. One example in the ophthalmic industry is progressive lens designs. Such lenses have a range of spherical and/or aspherical curves blended over an area not larger than 80 mm. For instance, a common progressive lens design, denoted a 6–200, is approximated by a spherical radius of curvature of about 84.8 mm (6.25 diopters of power at a reference refractive index of 1.53) in the distance portion of the lens surface that transitions over a distance of less than 15 mm to a radius of curvature in the reading zone of approximately 64 mm. These curvatures are blended in aspherical combinations to soften the contours of the final lens.

i. Comparative Example 3

A commercially available 6.25 diopter PC/polarizer film/PC laminate curved wafer (0.8 mm thick) was obtained. The curve was confirmed by comparison to a 6.25 diopter template. This polarizer wafer was positioned in the cavity of a standard thermoplastic injection-molding machine equipped with a concave insert molding surface contoured to a 6–200 design. Optical-grade PC was admitted at standard injection-molding temperatures and pressures to form a 6–200 lens incorporating this polarizer wafer.

The optical properties of the formed lens were evaluated visually and by optical focal length measurements. Visually, distortion was apparent to the unaided eye along the curve transitions to the steeper (shorter) radius. Even worse, in some instances the wafer delaminated from the main body of the lens in these transition zones. This result is clearly unacceptable to industry standards. Focal length measurements showed that in the reading zone, where a radius of 63.3–63.5 mm would be expected from measurements on the molding insert, only a radius of 65–63.8 mm was achieved. This comparative Example indicates that the standard wafer technology is not well adapted to conform to the aspherical mold shape, or to make a suitable optical product.

ii. Example 4

The apparatus 80 and method of Example 2 were used except a 6.25 diopter, spherical, concave mold surface 86 was employed.

The power transformer of the electrical heater 82 was set to 100%, and heated until the thermocouple 88 indicated 140° C. A piece of flat PET polarizer film 90 was positioned to bridge across the molding surface 86. The sealing surface 92 and o-ring 94 were then lowered via air ram pressure of 40 psi onto the film 90 to form an airtight seal. The heater 82 transformer was turned off, and the PET film 90 allowed to warm in this ambient, closed condition for 30 seconds. After the initial warming period, air pressure was admitted at 20 psi through the gas pressure port 96. The apparatus 80 was maintained at 135° C. at this pressure for 30 seconds. The cooling valves were then opened to admit chilled oil into the coils 84, and the formed film 90 allowed to cool under pressure until a temperature of 74° C. was achieved. The forming pressure was then released, the sealing surface 92 raised, and the formed PET film 90 removed.

The curvature of the formed film 90 was confirmed by comparison to a 6.25 diopter template. This formed polarizer film 90 was cut to size and positioned in the cavity of a standard thermoplastic injection-molding machine equipped with a concave insert molding surface contoured to a 6–200 design. Optical-grade PC was admitted at standard injection-molding temperatures and pressures to form a 6–200 lens incorporating this polarizer film 90.

The resulting lens showed no visual distortion along the transition zones of different radii of curvature. In addition, the correct optical lensing power was obtained. However, this spherically shaped film 90 could not cover the additional surface area present for an aspherical rather than a spherical shape. Hence, some edge portions of the lens were not covered by the polarizer film 90. This result suggests that either a larger diameter is needed, or a non-spherically formed film is more adaptable to incorporation with non-spherical designs.

However, a larger diameter of spherically formed film is not easily accommodated in an injection-molding apparatus.

Either the part will not fit securely in the injection-molding insert, or it will overlap the edges of the insert, which can keep the injection-molding cavity from closing properly and thus ruin the part. While some modification and accommodation is possible, options of non-spherical formed film are desired for broader production tolerance. This desire is explored in Example 5.

iii. Example 5

The apparatus 80 and method of Example 2 were used except an aspherical concave mold surface 86 was employed. This asymmetrical mold 86 had the blended contours of a front surface of a 6–200 progressive lens design, as described above in connection with Example 4.

The power transformer of the electrical heater 82 was set to 100%, and heated until the thermocouple 88 indicated 140° C. A piece of flat PET polarizer film 90 was positioned to bridge across the molding surface 86. The sealing surface 92 and o-ring 94 were then lowered via air ram pressure of 40 psi onto the film 90 to form an airtight seal. The heater 82 transformer was turned off, and the PET film 90 allowed to warm in this ambient, closed condition for 45 seconds. After the initial warming period, air pressure was admitted at 20 psi through the gas pressure port 96.

The apparatus 80 was maintained at 135° C. at this pressure for 30 seconds. The cooling valves were then opened to admit chilled oil into the coils 84, and the formed film 90 allowed to cool under pressure until a temperature of 74° C. was achieved. The forming pressure was then released, the sealing surface 92 raised, and the formed PET film 90 removed.

The asphericity of the formed film 90 could be visually seen by looking through the formed film 90 at a square, checkerboard pattern. The formed film 90 was of the same cosmetic quality as the flat film, and polarization was equivalent. This formed film 90 was cut to shape, and successfully injection molded with optical-grade PC resin to yield a polarized progressive lens with good optical qualities, including the correct optical power values.

Accordingly, an optical-quality plastic part comprising PET polarizer film and methods of its manufacture are disclosed, wherein the manufacturing process incorporates forming the PET polarizer film such that it conforms to the required contours of the optical part without compromising the part's optical and/or physical properties. While preferred embodiments are disclosed herein, many variations are possible which remain within the concept and scope of the invention. Such variations would become clear to one of ordinary skill in the art after inspection of the specification and drawings herein. The inventions therefore are not to be restricted except within the spirit and scope of the appended claims.

What is claimed is:

1. A method of optical-quality plastic part manufacture comprising the steps of:
    obtaining a non-laminated, heat-sensitive polarizing film;
    forming the film into a self-supporting, fixed, substantive curved shape utilizing a single mold surface to define a fixed contour without degrading the optical or mechanical properties of the film; and
    incorporating the formed film shape into an optical-quality plastic material without degrading the optical or mechanical properties of the film and maintaining the formed film shape prior to and during its incorporation to effect an optical-quality plastic part.

2. A method of optical-quality plastic part manufacture according to claim 1, wherein the forming step includes heating the mold surface.

3. A method of optical-quality plastic part manufacture according to claim 1, wherein the forming step is achieved without active vacuum.

4. A method of optical-quality plastic part manufacture according to claim 1, wherein the forming step includes indirectly warming the film, applying pressure to conform the film against the mold surface, then cooling the film to set the shape of the formed film.

5. A method of optical-quality plastic part manufacture according to claim 1, wherein the forming step includes heating the mold surface, bridging the film across the mold surface, allowing the film to warm indirectly by proximity to the mold surface, applying pressure to the film to conform it to the mold surface, then cooling the mold surface before removing the formed film shape.

6. A method of optical-quality plastic part manufacture according to claim 1, wherein the mold surface defines a spherical curve for the self-supporting formed film shape.

7. A method of optical-quality plastic part manufacture according to claim 1, wherein the mold surface defines a non-spherical curve for the self-supporting formed film shape.

8. A method of optical-quality plastic part manufacture according to claim 1, wherein the mold surface defines a combination of curves that may include spherical curves and aspherical curves for the self-supporting formed film shape.

9. A method of optical-quality plastic part manufacture according to claim 1, wherein the film is comprised of polyethylene terephthalate.

10. A method of optical-quality plastic part manufacture according to claim 9, wherein the film further comprises a crystalline or semi-crystalline naphthalene dicarboxylic acid polyester.

11. A method of optical-quality plastic part manufacture according to claim 1, wherein the forming step includes heating the mold surface to about 80–145° C., bridging the film across the mold surface to indirectly warm the film, applying pressure of about 10–50 psi to the film to conform it to the mold surface, then cooling the mold surface to about 70–85° C. before removing the formed film shape.

12. A method of optical-quality plastic part manufacture according to claim 1, wherein the film is bonded at or near a surface of the optical-quality plastic material.

13. A method of shaping a heat-sensitive polarizing film into a self-supporting, fixed, substantive curved shape to complement a defined contour of an optical-quality plastic part, said method comprising the steps of:
    indirectly warming a non-laminated, heat-sensitive polarizing film;
    applying pressure without utilizing complementary heated mold surfaces to conform the film against a curved mold surface;
    cooling the film to set the self-supporting, fixed curved shape of the formed film to complement and maintain the defined contour of the optical-quality plastic part without degrading the optical or mechanical properties of the film when subsequently incorporated into the optical-quality plastic part.

14. A method of forming a heat-sensitive polarizing film according to claim 13, wherein the film is indirectly warmed by heating the mold surface.

15. A method of forming a heat-sensitive polarizing film according to claim 13, wherein the film is cooled by cooling the mold surface.

16. A method of forming a heat-sensitive polarizing film according to claim 13, wherein the film is bridged across the heated mold surface to indirectly warm the film by proximity.

17. A method of forming a heat-sensitive polarizing film according to claim 13, wherein non-vacuum action pressure is applied to the film to conform it to the mold surface.

18. A method of forming a heat-sensitive polarizing film according to claim 13, wherein the mold surface defines a spherical curve for the self-supporting formed film shape.

19. A method of optical-quality plastic part manufacture according to claim 13, wherein the mold surface defines a non-spherical curve for the self-supporting formed film shape.

20. A method of optical-quality plastic part manufacture according to claim 13, wherein the film is comprised of polyethylene terephthalate.

21. A method of forming a heat-sensitive polarizing film according to claim 13, wherein the film is indirectly warmed by heating the mold surface to 80–145° C. and bridging the film across the mold surface.

22. A method of forming a heat-sensitive polarizing film according to claim 21, wherein pressure of about 10–50 psi is applied to the film to conform it against the mold surface.

23. A method of forming a heat-sensitive polarizing film according to claim 22, wherein the film is cooled by cooling the mold surface to about 70–85° C. before removing the formed film shape.

* * * * *